United States Patent [19]
Frutschi

[11] Patent Number: 5,148,668
[45] Date of Patent: Sep. 22, 1992

[54] COMBINED GAS/STEAM TURBINE POWER STATION PLANT

[75] Inventor: Hansulrich Frutschi, Riniken, Switzerland

[73] Assignee: Asea Brown Boveri Ltd., Baden, Switzerland

[21] Appl. No.: 642,407

[22] Filed: Jan. 17, 1991

[30] Foreign Application Priority Data

Jan. 31, 1990 [CH] Switzerland .............. 312/90-4

[51] Int. Cl.⁵ .................................... F02C 7/268
[52] U.S. Cl. .................. 60/39.05; 60/39.142; 60/39.182
[58] Field of Search .......... 60/39.05, 39.182, 39.55, 60/39.02, 39.142, 625, 626, 627

[56] References Cited

U.S. PATENT DOCUMENTS

| | | | |
|---|---|---|---|
| 3,747,336 | 7/1973 | Dibelius et al. | 60/39.55 |
| 4,353,206 | 10/1982 | Lee | 60/39.182 |
| 4,893,467 | 1/1990 | Woodson | 60/39.55 |

FOREIGN PATENT DOCUMENTS

| | | |
|---|---|---|
| 2245067 | 11/1973 | Fed. Rep. of Germany . |
| 3331153 | 3/1985 | Fed. Rep. of Germany . |
| 160502 | 9/1983 | Japan .................. 60/39.142 |
| 255244 | 11/1986 | Japan .................. 60/39.142 |
| 211358 | 9/1940 | Switzerland . |
| 1173923 | 12/1969 | United Kingdom . |

Primary Examiner—Louis J. Casaregola
Attorney, Agent, or Firm—Burns, Doane, Swecker & Mathis

[57] ABSTRACT

In a gas/steam power station plant (combined plant) the gas turbine group (1, 2, 3), the steam circuit (8, 9) and the waste heat boiler (4), individually of in combination with one another, are connected, directly or indirectly, operationally to a steam accumulator (12). This operational connection is one wherein a proportion of steam from the constantly charged-up steam accumulator (12) is available for an autonomous start-up of at least one steam turbine (8, 9), coupled to the gas turbine group, of the steam circuit, whereby the start capability of the combined plant can be increased.

4 Claims, 1 Drawing Sheet

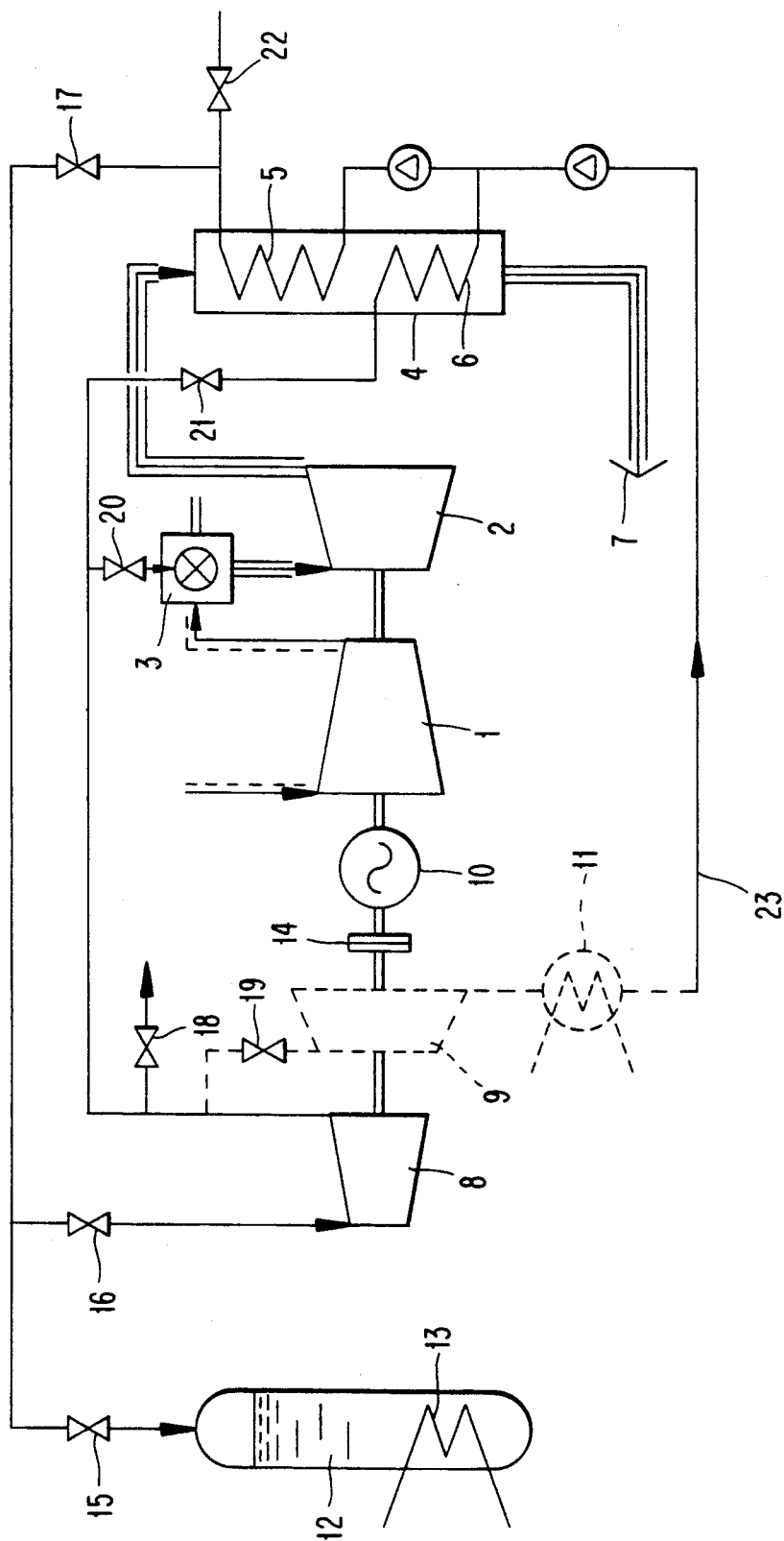

COMBINED GAS/STEAM TURBINE POWER STATION PLANT

BACKGROUND OF THE INVENTION

1. Field of the Invention

The present invention relates to a combined gas/steam turbine power station plant as defined by the preamble of claim 1. It also relates to a method of operating such a combined plant.

2. Discussion of Background

The term "combined gas/steam turbine power station plant" —abbreviated to combined plant below—is always understood as meaning the interaction of a gas turbine group with at least one steam turbine circuit, the exhaust gases from operation of the gas turbine group being passed through a waste heat steam generator (=waste heat boiler) in which the residual heat potential of said exhaust gases is used to generate the steam needed to act on the steam turbine. This additional steam generating capacity results in a higher thermal efficiency of the plant. Said combined plants therefore have a very good conversion efficiency which is in the order of magnitude of over 50%. Because, however, there is a discrepancy between the two types of engine (gas turbine group/steam turbine circuit) in relation to the respective start capability in terms of time, a delay may occur on starting in relation to the availability of the entire combined plant. A further bottleneck may arise in the start-up process if, in particular, no large electrical power is available for this purpose.

SUMMARY OF THE INVENTION

Accordingly, the object of this invention is to provide a remedy in this connection. As it is characterized in the claims, the object of the invention is to speed up the start capability in the case of a combined plant of the type mentioned in the preamble even in instances where the start-up programme could normally not be carried out as a consequence of an unduly low electrical power. In addition, an object of the invention is to keep the efficiency of the plant high, even with the handicap described above, and at least as high as that of combined plants with normal start capability.

The essential advantage of the invention is to be seen in the fact that the steam turbine circuit including boiler is kept at preheat temperature with the aid of a steam accumulator, so that the steam turbine section can be started up just as rapidly as the gas turbine group itself. The feeding of steam of suitably moderate temperature from the accumulator to the steam turbine during the start-up process takes effect in a similar manner. In addition, a further advantage emerges from the invention, which is that no large electrical power is necessary for the starting-up process, so much so that a so-called "black start" is possible.

To summarize, the advantages of the invention can be summarized as follows:

An integral rapid-start capability of the entire combined plant exists.

The combined plant is capable of starting up autonomously.

The entire combined plant is inexpensive because it is able to dispense with expensive electrical auxiliary assemblies for increasing the start capability.

Advantageous and expedient further developments of the achievement of the object according to the invention are characterized in the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, in which all the elements which are not required for immediate understanding of the invention have been omitted and the direction of flow of the media is indicated by arrows, wherein:

The sole figure shows a circuit diagram of a combined plant.

DESCRIPTION OF THE PREFERRED EMBODIMENTS

Referring now to the drawing, the sole figure shows a circuit of a power station plant (=combined plant) which comprises the interaction of a gas turbine group with a steam turbine circuit, a waste heat boiler 4 being inserted between the two blocks. The gas turbine group connected upstream of the waste heat boiler 4 and also of the steam turbine circuit essentially comprises a compressor 1, a gas turbine 2 preferably mounted with the latter on a common shaft, a generator 10 coupled to the rotation of these two machines and a combustion chamber 3 disposed between compressor 1 and gas turbine 2. The air taken in by the compressor 1 is compressed therein, then said air flows into the combustion chamber 3. As fuel for operating said combustion chamber 3, gaseous and/or liquid fuels are suitable. The hot gases produced in the combustion chamber 3 act on the gas turbine 2 in the subsequent process; after their expansion, said hot gases which have been used up in terms of pressure flow as flue gases through the waste heat boiler 4, in which their thermal residue is potentially exploited further, to such an extent that, as a result of heat exchange, the steam generation is made available for feeding a downstream steam turbine 8. As the figure is intended to show, a further steam turbine 9, which is, for example, a low-pressure turbine, may be inserted downstream of the first steam turbine 8. The waste heat boiler 4 shown is a two-pressure waste heat boiler. Obviously, a single-pressure waste heat boiler may also be used. However, the former has the advantage over the latter that the temperature of the flue gases can be lowered further, as a result of which the efficiency of the combined plant is increased. Optionally, an additional furnace which is not shown in the figure and which upgrades the gas turbine exhaust gases to a higher temperature level can be added to the waste heat boiler 4. The last-mentioned measure proves advantageous if the power output of the combined plant has to be increased at peak loads. The use of a three-pressure waste heat boiler is furthermore also possible. High- and low-pressure steam, which acts on the appropriate steam turbine, is therefore predominantly produced from the thermal energy of the gas turbine exhaust gases. As emerges from the figure, these steam turbines are advantageously coupled 14 to the same generator 10 of the gas turbine group. The generation of two steam pressures makes it possible to utilize the potential of the gas turbine exhaust gases optimally, such that said exhaust gases, which still have a temperature of approximately 500 degrees Celsius at the end of the gas turbine process, can be reduced to approximately 100 degrees Celsius. After leaving the last steam turbine 9, the expanded steam then flows into a condenser 11, it being possible to use, in this case, water or air as coolant. Conveyed by pumps, the condensate normally flows into a preheater (not shown) and from there into a feed water container and degasser which is likewise not shown. After passing through these stages, the condensate has been upgraded to such an extent that it can be returned again to the waste heat boiler 4 via a line 23.

The combined plant is connected to a steam accumulator 12 which has the ultimate purpose, as is explained further below, of making possible a reliable, autonomous start-up of the combined plant. During the operation of the combined plant, the steam accumulator 12 is gradually charged via a valve 15 which is sited in the steam line from the high-pressure steam generation system of the waste heat boiler 4, said charging taking place as a result of condensation of steam. There is additionally the possibility of charging the steam accumulator 12 with extraneous energy by means of a heating device 13. If, therefore, the combined plant is to be started up, steam is supplied, with valve 17 in the steam line from the waste heat boiler 4 closed, from the steam accumulator 12 via the valve 15 to a valve 16 which is situated in the steam feed line to the steam turbine 8. The necessary start-up power for the gas turbine group 1, 2 can be produced by means of the steam turbine section 8 as a result of slightly opening said valve 16 and completely opening a further valve 18 which is situated in the exhaust steam line of the steam turbine 8. This start-up power is about 5% of the power nominally delivered by the two steam turbine sections 8, 9. Because it is possible, with severe throttling in the valve 16 sited upstream of the steam turbine 8, to run at a few bars above the further valve 18 sited in the exhaust steam line and with unconfined exhaust, the steam turbine section 8 operates under good thermodynamic conditions. While one closed valve 20 and 21 in each case suppresses the communication of the waste steam from the steam turbine section with the combustion chamber 3 and the low-pressure evaporator bank 6 of the waste heat boiler 4, a severely throttled setting of a further valve 19, which is sited in the waste steam line of the steam turbine section 8 upstream of the exhaust valve 18, makes possible the passage of the necessary amount of cool steam through the steam turbine section 9 situated downstream of the first steam turbine section 8, provided such a section is in fact present, a vacuum being produced by the condenser 11 situated downstream of the last-mentioned steam turbine section, which vacuum minimizes the ventilation losses. In parallel with the latter, the compressor 1 starts to deliver air to the combustion chamber 3, with the result that fuel can gradually be supplied and ignited. The hot gases which form immediately act on the turbine 2 and assist in accelerating the gas turbine group. Finally, the nominal rotary speed is reached, and the generator 10 is synchronized with the power mains, connected in parallel and loaded without the steam supply to the first turbine 8 being interrupted. The latter is in fact now by and large well preheated and consequently capable of being acted on by steam of higher pressure as soon as the latter is produced in sufficient quality in the waste heat boiler 4. A bypass valve 22 sited in the connection, which is not shown, to the condenser 11 will therefore be closed and the other valve 17 in the steam feed line to the steam turbine 8 opened. By completely opening the two valves 16 and 19 in the respective steam feed line to the two steam turbines 8 and 9 and also by closing the exhaust valve 18, the entire steam circuit can be set in operation. During this transition phase, steam can still be added from the accumulator 12 to the steam turbine circuit. As soon as the steam production in the high-pressure steam generation bank 5 of the waste heat boiler 4 is quantitatively quite sufficient, the steam accumulator 12 can be recharged via the accumulator valve 15. If the gas turbine 2 of the combined plant is designed as a so-called steam injection gas turbine (STIG) and the second steam turbine 9 and the condenser 11 are accordingly absent in the present case, the waste steam of the sole steam turbine section 8 is conveyed directly into the gas turbine circuit and in particular, advantageously in the region of the combustion chamber 3. It is, however, also possible to use at least some of this waste steam as coolant for the gas turbine.

As already mentioned above, in order to utilize, the flue gases 7 as completely as possible, ie. insofar as the corresponding acid dew point permits it, in the waste heat boiler 4, it may be advantageous, depending on the gas turbine type, to insert a further low-pressure steam generator bank 6 downstream of the high-pressure steam generator bank 5. The steam generated in the last-mentioned bank is advantageously equivalent in terms of pressure to that which flows from the steam turbine circuit into the combustion chamber 3 via the valve 20.

But even if a so-called combined plant is present as the result of the existence of the second steam turbine section 9 and the condenser 11, it may be advantageous to feed some of the steam of suitable pressure to the gas turbine circuit via the valve 20 or by another path, be this to counteract excessive NOx, for cooling purposes or for other reasons.

A plant designed in this way can keep the steam turbine circuit, including waste heat boiler 4, at preheat temperature with the aid of the steam accumulator 12, with the result that the steam turbine section 8 can be started up just as rapidly as the gas turbine 2. This therefore involves the combination of a rapid start capability of a gas turbine with the good efficiency of a combined plant, with the additional advantages which at best result from a steam injection into the gas turbine group (STIG). As emerges from the above comments, no large electrical power has to be available for the start-up process. A so-called "black start" becomes possible The coupling 14 between gas turbine group and steam turbine circuit, which is designed, for example, as an overrunning clutch, makes it possible to operate the combined plant as a so-called "SIMPLE STIG", i.e. without the use of the steam turbine 8. The latter is then not designed as a back-pressure turbine, but merely as a pony turbine; in that case it is shut down again after starting has taken place. The waste heat boiler 4 has then only to generate a low-pressure steam as is used for injection into the combustion chamber. In such a configuration, the steam accumulator 12 is then also limited to this pressure level unless it is charged to a higher potential with extraneous energy 13, which may be done indirectly by means of the heating device already mentioned or directly by means of a steam.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by letters patent of the United States is:

1. A method for operating a gas/steam power plant wherein at least one steam turbine and at least one gas turbine drive an electrical generator comprising the steps of:

supplying throttled steam from a steam reservoir to said at least one steam turbine for start-up of the gas/steam power plant;

throttling said stem from said steam reservoir such that a start-up power of said at least one steam turbine is generated that is a fraction of a nominal output power of said at least one steam turbine blocking during start-up a supply of steam to said steam reservoir from a waste heat boiler that is positioned to receive exhaust gas of said at least one gas turbine;

blocking at least during start-up a steam supply to a combustion chamber of said at least one gas turbine;

gradually delivering and igniting air and fuel in said combustion chamber of said at least one gas turbine; and, switching the supply of steam to said at least one steam turbine from said steam reservoir to an evaporator bank of said waste heat boiler according to the attainment of a nominal rotary speed of said gas/steam power plant.

2. A method for operating a gas/steam power plant according to claim 1, wherein at least a portion of steam from said at least one steam turbine is supplied as coolant to said at least one gas turbine.

3. A method for operating a gas/steam power plant according to claim 1, wherein after start-up, the steam reservoir is re-charged with steam from said waste-heat boiler.

4. A method for operating a gas/steam power plant according to claim 1, wherein during start-up, throttled exhaust steam from said at least one steam turbine is supplied to an additional steam turbine section disposed downstream of said at least one steam turbine such that said throttled exhaust steam serves to cool said additional steam turbine.

* * * * *